United States Patent
Ishida et al.

(10) Patent No.: US 11,724,901 B2
(45) Date of Patent: Aug. 15, 2023

(54) GLASS ROLL

(71) Applicant: Nippon Electric Glass Co., Ltd., Shiga (JP)

(72) Inventors: Naoya Ishida, Shiga (JP); Kaoru Mitsugi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 1172 days.

(21) Appl. No.: 16/323,017

(22) PCT Filed: Oct. 13, 2017

(86) PCT No.: PCT/JP2017/037269
§ 371 (c)(1),
(2) Date: Feb. 4, 2019

(87) PCT Pub. No.: WO2018/074383
PCT Pub. Date: Apr. 26, 2018

(65) Prior Publication Data
US 2019/0177104 A1 Jun. 13, 2019

(30) Foreign Application Priority Data
Oct. 17, 2016 (JP) .................................. 2016-203427

(51) Int. Cl.
*B65H 18/28* (2006.01)
*B65D 85/672* (2006.01)
(Continued)

(52) U.S. Cl.
CPC ........... *B65H 18/28* (2013.01); *B65D 85/672* (2013.01); *B65H 75/02* (2013.01); *B65H 75/14* (2013.01);
(Continued)

(58) Field of Classification Search
USPC ....................................................... 242/536
See application file for complete search history.

(56) References Cited

U.S. PATENT DOCUMENTS

| | | | | |
|---|---|---|---|---|
| 2010/0260964 A1* | 10/2010 | Nakamura | ............ | C03B 17/064 242/160.4 |
| 2011/0023548 A1* | 2/2011 | Garner | ................... | B65H 20/02 65/106 |

(Continued)

FOREIGN PATENT DOCUMENTS

| | | |
|---|---|---|
| CN | 102271909 | 12/2011 |
| WO | 2010/038761 | 4/2010 |

(Continued)

OTHER PUBLICATIONS

International Preliminary Report on Patentability and Written Opinion of the International Searching Authority dated Jan. 9, 2018 in International (PCT) Application No. PCT/JP2017/037269.

(Continued)

*Primary Examiner* — William A. Rivera
(74) *Attorney, Agent, or Firm* — Wenderoth, Lind & Ponack, L.L.P.

(57) ABSTRACT

Provided is a glass roll (1), including: a winding core (2); a film body (F), which is taken up into a roll shape by the winding core (2), and includes a glass film (3) and a scattering prevention film (7) having a smaller width than the glass film (3); and flanges (8) which are mounted to the winding core (2), and which are arranged on both sides of the film body (F) in a width direction. The film body (F) includes a detachable displacement prevention film (6) on a termination end portion side of the glass film (3) in a take-up direction. The displacement prevention film (6) includes a wide portion (6a) having a lager width than the glass film (3).

3 Claims, 4 Drawing Sheets

(51) Int. Cl.
  *B65H 75/14* (2006.01)
  *C03B 17/06* (2006.01)
  *B65H 75/02* (2006.01)

(52) U.S. Cl.
  CPC .... *C03B 17/06* (2013.01); *B65H 2301/41427* (2013.01); *B65H 2701/1712* (2013.01); *B65H 2701/17262* (2013.01); *B65H 2801/61* (2013.01)

(56) References Cited

U.S. PATENT DOCUMENTS

| | | | |
|---|---|---|---|
| 2011/0192878 A1 | 8/2011 | Teranishi et al. | |
| 2012/0237779 A1* | 9/2012 | Teranishi | B65D 85/672 65/106 |
| 2015/0314572 A1* | 11/2015 | Murashige | B32B 17/10 242/534 |
| 2016/0016746 A1 | 1/2016 | Teranishi et al. | |
| 2017/0232701 A1* | 8/2017 | Keite-Telgenbüscher | B32B 7/06 428/189 |
| 2020/0346966 A1* | 11/2020 | Mori | B65H 35/02 |
| 2021/0138762 A1* | 5/2021 | Sato | B32B 17/10018 |
| 2021/0138764 A1* | 5/2021 | Murashige | C09J 7/38 |

FOREIGN PATENT DOCUMENTS

| | | | |
|---|---|---|---|
| WO | WO 2013/011928 | * | 1/2013 |
| WO | WO 2017/104364 | * | 6/2017 |

OTHER PUBLICATIONS

Chinese Office Action dated Mar. 11, 2020 in counterpart Chinese Patent Application No. 201780037890.5 with English translation of the Chinese Search Report.
International Search Report dated Jan. 9, 2018 in International (PCT) Application No. PCT/JP2017/037269.

* cited by examiner

GLASS ROLL

TECHNICAL FIELD

The present invention relates to a glass roll including a winding core, a glass film taken up into a roll shape by the winding core, and flanges mounted to the winding core on both sides of the glass film in a width direction.

BACKGROUND ART

In recent years, there is a demand for further thinning of various glass sheets including glass substrates for a flat panel display, such as a liquid crystal display, a plasma display, an OLED display, or a field emission display. Therefore, along with the demand, a glass sheet that is thinned into a film, a so-called glass film, is being developed. For example, a glass film having a thickness of 300 μm or less has been developed.

As a packing form of such glass film, a form of taking up the glass film into a roll shape to form a glass roll is widely employed (for example, see Patent Literature 1). Such packing form utilizes the characteristics of the glass film of having good flexibility by virtue of its small thickness, and has the advantage of, for example, being capable of saving a space occupied by the glass film after packing.

In addition, investigations have been made into formation of a functional film or the like on the glass film by a so-called roll to roll process, in which the glass roll is supplied while fed, and the functional film or the like is formed on a surface of the glass film, and then the glass film having formed on the surface thereof the functional film or the like is taken up again. This is convenient because film formation treatment can be performed on the glass film continuously by merely unwinding the glass film from the glass roll sequentially.

CITATION LIST

Patent Literature 1: WO 2010/038761 A1

SUMMARY OF INVENTION

Technical Problem

Incidentally, in the glass roll, a phenomenon called "winding displacement", in which the glass film is displaced in its width direction, may occur owing to vibration during transport of the glass roll. The winding displacement may result in breakage of the glass film during transport of the glass roll or in a step subsequent to unwinding of the glass film from the glass roll. In order to prevent the winding displacement, it is usually the case that flanges are mounted to a winding core so as to be arranged on both sides of the glass film in a width direction.

Meanwhile, in order to prevent scattering of broken pieces at the time of breakage, a scattering prevention film is attached to the glass film in some cases. When the scattering prevention film covers both end portions of the glass film in the width direction, there is a risk in that, in a conveying device or the like, both the end portions of the glass film in the width direction cannot be recognized, and the glass film cannot be positioned. Therefore, in some cases, the scattering prevention film is required to have a smaller width than the glass film so as not to cover both the end portions of the glass film in the width direction.

However, in a specification of using the scattering prevention film having a smaller width than the glass film, both the end portions of the glass film in the width direction are exposed. When both the end portions of the glass film in the width direction are exposed, both the end portions of the glass film may be broken when receiving an impact owing to, for example, the presence of microcracks. Therefore, in the case where the above-mentioned flanges are mounted to the winding core, both the end portions of the glass film in the width direction may be broken when both the end portions of the glass film abut on the flanges. From this viewpoint, it is preferred that the flanges be not mounted to the winding core in the case of using the scattering prevention film having a smaller width than the glass film. However, in this case, the winding displacement may occur owing to vibration during transport of the glass roll.

The present invention has been made in view of the above-mentioned circumstances, and a technical object of the present invention is to provide a glass roll capable of preventing winding displacement during transport even when a scattering prevention film having a smaller width than a glass film is used.

Solution to Problem

A glass roll according to one embodiment of the present invention, which has been devised to achieve the above-mentioned object, comprises: a winding core; a film body, which is taken up into a roll shape by the winding core, and comprises a glass film and a scattering prevention film having a smaller width than the glass film; and flanges, which are mounted to the winding core, and are arranged on both sides of the film body in a width direction, wherein the film body comprises a detachable displacement prevention film on a termination end portion side of the glass film in a take-up direction, and wherein the displacement prevention film comprises a wide portion having a lager width than the glass film. As used herein, the "width direction" of the film body refers to a direction along a surface of the film body and perpendicular to a take-up direction of the film body, and the "width" refers to a size in the width direction. The same applies to constituent elements of the film body (the same applies hereinafter).

With the above-mentioned configuration, even when winding displacement nearly occurs in the glass film during transport of the glass roll, the occurrence of the winding displacement can be prevented because the wide portion of the displacement prevention film is in a state of abutting on the flange or abuts on the flange. That is, according to the glass roll according to the embodiment of the present invention, even when the scattering prevention film having a smaller width than the glass film is used, the winding displacement during transport can be prevented.

In addition, the displacement prevention film is on the termination end portion side of the glass film in the take-up direction, and is on a start end portion side of the film body at the time of unwinding the glass film from the glass roll. Moreover, the displacement prevention film is detachable, and hence it is easy to detach the displacement prevention film from the film body when the glass film is used by being unwound from the glass roll.

In the above-mentioned configuration, the film body may comprise a lead film having a smaller width than the wide portion on the termination end portion side, and the displacement prevention film may be attached to the lead film.

With the above-mentioned configuration, the possibility of breakage of the glass film can be reduced as compared to a case in which the displacement prevention film is attached directly to the glass film.

In the above-mentioned configuration, the displacement prevention film may be in a state of overlapping with the lead film, and an overlapping region of the displacement prevention film with the lead film may be bonded to the lead film.

With the above-mentioned configuration, the displacement prevention film is fixed to the lead film more reliably, and hence an effect of more reliably preventing the winding displacement can be obtained in the lead film and the glass film.

In the above-mentioned configuration, a start end portion of the displacement prevention film in the take-up direction may be attached to a termination end portion of the lead film in the take-up direction.

With the above-mentioned configuration, the displacement prevention film is on a further start end portion side of the film body at the time of unwinding the glass film from the glass roll. Accordingly, it is easier to detach the displacement prevention film from the film body when the glass film is used by being unwound from the glass roll.

Advantageous Effects of Invention

As described above, according to the present invention, the glass roll capable of preventing winding displacement during transport even when a scattering prevention film having a smaller width than a glass film is used can be provided.

DESCRIPTION OF EMBODIMENTS

Embodiments of the present invention are described below with reference to the drawings.

Figure 1:
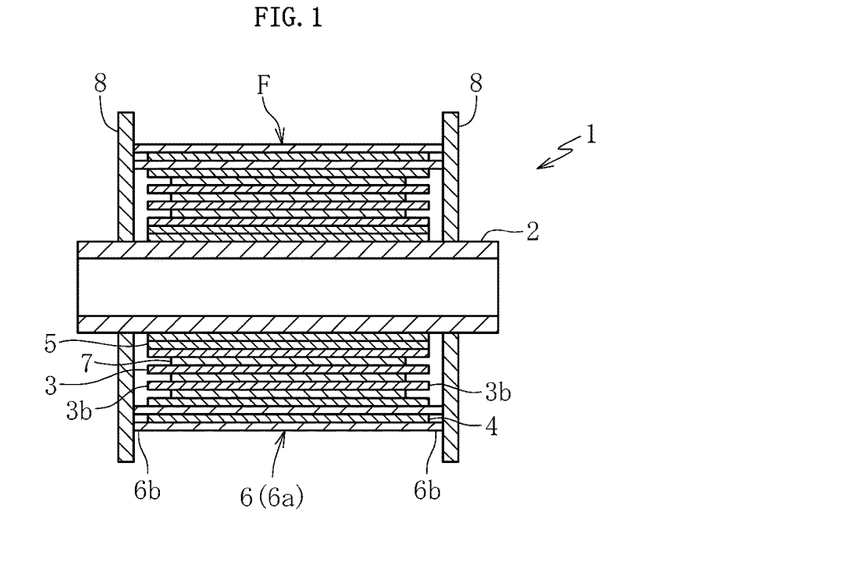
FIG. 1 is a schematic sectional view of a glass roll according to a first embodiment of the present invention.

FIG. 1 is a schematic sectional view of a glass roll according to a first embodiment of the present invention. A glass roll 1 comprises: a winding core 2; a film body F comprising a glass film 3, lead films 4 and 5, a displacement prevention film 6, and a scattering prevention film 7; and a pair of flanges 8 and 8. The film body F is taken up into a roll shape by the winding core 2. The film body F has a strip shape in which a longitudinal direction corresponds to a take-up direction. The same applies to the glass film 3. The scattering prevention film 7 has a smaller width than the glass film 3. The pair of flanges 8 and 8 are mounted to the winding core 2. The pair of flanges 8 and 8 are arranged on both sides of the film body F in a width direction, and have a winding displacement preventing function.

In this embodiment, the winding core 2 has a cylindrical shape. However, the shape of the winding core 2 is not limited thereto, and the winding core 2 may have, for example, a solid columnar shape. In addition, the flange 8 is detachable from the winding core 2. However, the manner in which the flange 8 is mounted to the winding core 2 is not limited thereto, and the flange 8 may remain fixed to the winding core 2.

Figure 2:
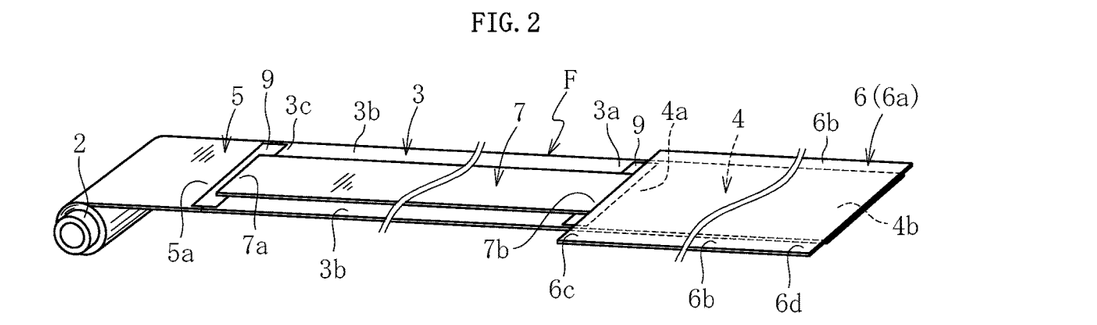
FIG. 2 is a schematic perspective view of a state in which a film body according to the first embodiment starts to be taken up by a winding core.
Figure 3:
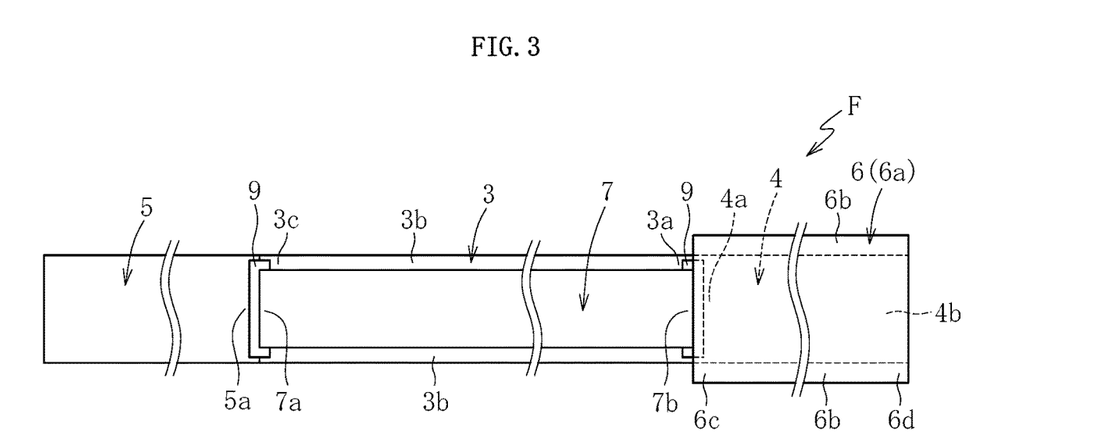
FIG. 3 is a schematic plan view of a state in which the film body according to the first embodiment is developed.

As illustrated in FIG. 2 and FIG. 3, the film body F comprises the displacement prevention film 6 on a termination end portion 3a side of the glass film 3 in the take-up direction, the displacement prevention film 6 being detachable from the lead film 4. The displacement prevention film 6 comprises a wide portion 6a having a larger width than the glass film 3. In this embodiment, the wide portion 6a of the displacement prevention film 6 corresponds to an entire region of the displacement prevention film 6 in the take-up direction, but may be part of the region of the displacement prevention film 6 in the take-up direction. An entire region of the lead film 4 in the take-up direction has a smaller width than the wide portion 6a of the displacement prevention film 6.

As illustrated in FIG. 1, the displacement prevention film 6 is arranged under a state in which both end portions 6b and 6b of the wide portion 6a in the width direction protrude with respect to both end portions 3b and 3b of the glass film 3 in the width direction. The pair of flanges 8 and 8 are arranged on both sides of the wide portion 6a in the width direction. Both the end portions 6b and 6b of the wide portion 6a in the width direction are in a state of abutting on the pair of flanges 8 and 8 or in a state of facing the pair of flanges 8 and 8 through intermediation of micro gaps.

As illustrated in FIG. 2 and FIG. 3, the displacement prevention film 6 is attached to the lead film 4 under a state in which the displacement prevention film 6 overlaps with the lead film 4, and an overlapping region of the displacement prevention film 6 with the lead film 4 is bonded to the lead film 4. In this embodiment, the lead film 4 and the displacement prevention film 6 may have the same size in the take-up direction, but may have different sizes. In addition, end surfaces of end portions 4a and 4b of the lead film 4 in the take-up direction are located at the same positions in the take-up direction as end surfaces of end portions 6c and 6d of the displacement prevention film 6 in the take-up direction, respectively, but may be located at different positions in the take-up direction.

In this embodiment, the displacement prevention film 6 is bonded to the lead film 4 with an elastic adhesive, but other adhesives, such as an acrylic adhesive, a silicon-based adhesive, and a rubber-based adhesive, may be used. As the adhesive, an adhesive with which a bonded portion between the displacement prevention film 6 and the lead film 4 can be separated again is used.

The lead films 4 and 5 are attached to both end portions 3a and 3c of the glass film 3 in the longitudinal direction (take-up direction), respectively, with a connecting tape 9 (resin member).

The lead film 4 is a member to be loaded into a treatment device in advance of the glass film 3 in a roll-to-roll method so that the glass film 3 is prevented from being damaged, and the lead film 5 is a member to be loaded into the treatment device after the glass film 3 so that even a termination end of the glass film 3 to be unwound from the glass roll 1 can be treated.

The termination end portion 3a of the glass film 3 in the take-up direction and the start end portion 4a of the lead film 4 in the take-up direction, the lead film 4 being on the termination end portion side of the glass film 3 in the take-up direction, are in a state of not overlapping with each other but butting each other, or in a state of facing each other with a gap therebetween. The termination end portion 3a of the glass film 3 in the take-up direction and the start end portion 4a of the lead film 4 in the take-up direction are connected to each other by bonding the connecting tape 9 to the termination end portion 3a and the start end portion 4a so that the connecting tape 9 straddles both the portions.

The start end portion 3c of the glass film 3 in the take-up direction and a termination end portion 5a of the lead film 5 in the take-up direction, the lead film 5 being on a start end portion side of the glass film 3 in the take-up direction, are in a state of not overlapping with each other but butting each other, or in a state of facing each other with a gap therebetween. The start end portion 3c of the glass film 3 in the take-up direction and the termination end portion 5a of the lead film 5 in the take-up direction are connected to each other by bonding the connecting tape 9 to the start end portion 3c and the termination end portion 5a so that the connecting tape 9 straddles both the portions.

In addition, the scattering prevention film 7 is attached to a middle portion on one surface of the glass film 3 in the width direction along the longitudinal direction (take-up direction). Both end portions 7a and 7b of the scattering prevention film 7 in the longitudinal direction each overlap with the connecting tape 9.

The scattering prevention film 7 is attached to a surface of the glass film 3 to be on an outer peripheral side of the glass roll 1 after the glass film 3 is taken up. The scattering prevention film 7 may be interposed so as to be brought into contact with a surface of the glass film 3 to be on an inner peripheral side of the glass roll 1 after the glass film 3 is taken up. The connecting tapes 9 are attached to the surface of the glass film 3 and surfaces of the lead films 4 and 5 to be on the outer peripheral side of the glass roll 1 after the glass film 3 and the lead films 4 and 5 are taken up. In addition, the displacement prevention film 6 overlaps with the surface of the lead film 4 to be on the outer peripheral side of the glass roll 1 after the lead film 4 is taken up.

The glass film 3 is formed by an overflow down-draw method to have a thickness of from 1 μm to 200 μm (preferably from 10 μm to 100 μm). The reason why the glass film is set to have such a thickness is because, with the thickness within the above-mentioned numerical range, appropriate flexibility and strength can be imparted to the glass film 3 and no trouble arises at the time of winding. In other words, when the thickness of the glass film 3 is less than 1 μm, handling of the glass film is troublesome because of lack of strength. When the thickness of the glass film 3 exceeds 200 μm, satisfactory flexibility is not obtained, which leads to a problem in that a winding radius is extremely and inevitably increased.

A width of the glass film 3 is preferably 100 mm or more, more preferably 300 mm or more, still more preferably 500 mm or more. The glass film 3 is used for a wide variety of devices including a small-screen display, such as a mobile phone with a small size, and a large-screen display, such as a television set with a large size, and hence it is preferred that the width of the glass film 3 be finally selected as needed depending on a size of a substrate of a device to be used.

As a glass composition of the glass film 3, there can be used various glass compositions of silicate glass and the like, such as silica glass and borosilicate glass. However, it is preferred to use non-alkali glass. The reason is as follows. When the glass film 3 contains an alkali component, a so-called too-abundant soda phenomenon occurs so that the glass film is structurally weathered. When the glass film 3 is curved, there is a risk in that the glass film is prone to break from a portion that is structurally weathered over time. Herein, the non-alkali glass refers to glass that does not substantially contain an alkali component, specifically, glass containing an alkali metal oxide of 1,000 ppm or less (preferably of 500 ppm or less, more preferably of 300 ppm or less).

In addition, in view of ensuring strength of the glass film 3, it is preferred that at least each end surface in the width direction of the glass film 3 include a cut surface which is cut by laser splitting. With this configuration, the each end surface in the width direction of the glass film 3 has a cross-section with high strength free from defects causing breakage, such as microcracks. Specifically, when utilizing the laser splitting, without being subjected to polishing or the like after the cutting, the each end surface in the width direction of the glass film 3 may have an arithmetic average roughness Ra (compliant to JIS B0601:2001) of 0.1 μm or less (preferably 0.05 μm or less).

A thickness and a width of each of the lead films 4 and 5 are not particularly limited. However, considering that the lead film is caused to pass through in the same roll-to-roll apparatus as the glass film 3, it is preferred that the lead film have substantially the same thickness and width as those of the glass film 3.

Specifically, the thicknesses of the lead films 4 and 5 are each preferably from 1 μm to 200 μm, and the widths of the lead films 4 and 5 are each preferably from 0.9 time to 1.1 times as large as the width of the glass film 3, and are each particularly preferably substantially the same as the width of the glass film 3 in consideration of loading into the treatment device. The lead films 4 and 5 are each required to have enough strength to tow the glass film 3, and hence it is preferred to finally decide the thicknesses of the lead films 4 and 5 in consideration of, for example, materials for forming the lead films 4 and 5.

As materials for the lead films 4 and 5, the same materials as in the case of the displacement prevention film 6 described below are given. A material difficult to stretch is preferably used, and a polyethylene terephthalate film (PET film) is preferably used. A metal film may be used, and in this case, aluminum, copper, or the like may be used as the metal.

The thickness of the displacement prevention film 6 is not particularly limited, but is preferably about the same as the thickness of the glass film 3. Specifically, the thickness of the displacement prevention film 6 is preferably from 1 μm to 200 μm.

The width of the displacement prevention film 6 is larger than the width of the glass film 3 by from 5 mm to 50 mm (preferably from 10 mm to 30 mm) in order to achieve the object of preventing winding displacement of the glass film 3.

As a material for the displacement prevention film 6, for example, an organic resin film (synthetic resin film), such as an ionomer film, a polyethylene film, a polypropylene film, a polyvinyl chloride film, a polyvinylidene chloride film, a polyvinyl alcohol film, a polyester film, a polycarbonate film, a polystyrene film, a polyacrylonitrile film, an ethylene-vinyl acetate copolymer film, an ethylene-vinyl alcohol copolymer film, an ethylene-methacrylic acid copolymer film, a nylon (registered trademark) film (polyamide film), a polyimide film, or cellophane, may be used. Further, from the viewpoint of ensuring cushioning performance and strength at the same time, a foamed resin film, such as a sheet made of a polyethylene foamed resin, is preferably used as the displacement prevention film 6, and from the viewpoint of ensuring strength, a polyethylene terephthalate film (PET film) is preferably used as the displacement prevention film 6.

The scattering prevention film 7 is a member for preventing scattering of broken pieces of the glass film 3 even when the glass film 3 is broken. In this embodiment, the scattering prevention film 7 comprises a support layer without a pressure-sensitive adhesive property and a pressure-sensitive adhesive layer for attachment to the glass film 3 formed on one surface of the support layer.

The thickness of the scattering prevention film 7 is not particularly limited, but is preferably about the same as the thickness of the glass film 3 because the scattering prevention film 7 is generally attached to a surface of the glass film 3. Specifically, the thickness of the scattering prevention film 7 is preferably from 1 µm to 8 mm.

When the scattering prevention film 7 covers both the end portions 3b and 3b of the glass film 3 in the width direction, there is a risk in that both the end portions 3b and 3b of the glass film 3 in the width direction are not recognized in, for example, a conveying device, and positioning of the glass film 3 or the like becomes difficult. Therefore, the width of the scattering prevention film 7 is smaller than the width of the glass film 3 by from 1 mm to 30 mm (preferably from 5 mm to 10 mm).

As a material for the support layer of the scattering prevention film 7, the same materials as in the case of the displacement prevention film 6 described above are given. As a material for the pressure-sensitive adhesive layer of the scattering prevention film 7, there are given, for example, an elastic adhesive, an acrylic adhesive, a silicon-based adhesive, and a rubber-based adhesive. As the adhesive, an adhesive with which a bonded portion between the scattering prevention film 7 and the glass film 3 can be separated again is used. The scattering prevention film 7 includes a mode in which the scattering prevention film 7 is formed only of the support layer without the pressure-sensitive adhesive layer, and in this case, has the same function as a slip sheet.

In this embodiment, the connecting tape 9 comprises a support layer without a pressure-sensitive adhesive property and a pressure-sensitive adhesive layer for attachment to the glass film 3 and the lead films 4 and 5 formed on one surface of the support layer. The lengths of the connecting tape 9 in the take-up direction and the width direction of the glass film 3 and the lead films 4 and 5 are appropriately set in consideration of, for example, desired strength.

The thickness of the support layer of the connecting tape 9 is preferably 150 µm or less, more preferably 100 µm or less. Moreover, the thickness of the support layer is preferably 10 µm or more, more preferably 30 µm or more. When the thickness of the support layer is less than 10 µm, strength may be impaired, and when the thickness of the support layer is more than 150 µm, flexibility may be insufficient, or a load may be applied to the glass film 3 depending on the thickness of the support layer after the glass film 3 is taken up.

The thickness of the pressure-sensitive adhesive layer of the connecting tape 9 is appropriately set in consideration of adhesion strength, and is, for example, from 10 µm to 15 µm. In addition, when the thickness of the connecting tape 9 is large, drain after washing with water becomes poor owing to a step between the connecting tape 9 and the glass film 3 or each of the lead films 4 and 5, and a water scale may occur in a region around the step. Accordingly, from this viewpoint, the total thickness of the support layer and the pressure-sensitive adhesive layer is preferably 60 µm or less.

Materials for the support layer and the pressure-sensitive adhesive layer of the connecting tape 9 are not particularly limited, and may be materials which have hitherto been used. An example of the material for the support layer is a resin, such as polyester. Examples of the material for the pressure-sensitive adhesive layer include an elastic adhesive, an acrylic adhesive, a silicon-based adhesive, and a rubber-based adhesive. As the adhesive, an adhesive with which a bonded portion between the connecting tape 9 and each of the lead films 4 and 5 or the glass film 3 can be separated again is used.

Next, a method of producing the glass roll 1 is described.

First, each of the lead films 4 and 5 is attached to the glass film 3 with the connecting tape 9. Then, the scattering prevention film 7 is attached to the glass film. After that, the displacement prevention film 6 is attached to the lead film 4 with an elastic adhesive. Thus, the film body F is completed.

Next, the film body F is taken up into a roll shape by the winding core 2. After that, the pair of flanges 8 and 8 are mounted to the winding core 2. Thus, the glass roll 1 is completed.

When the glass roll 1 is used, the displacement prevention film 6 is detached from the film body F, and the residual film body F is introduced into a treatment device.

The glass roll 1 according to this embodiment having the above-mentioned configuration can exhibit the following effects.

Even when winding displacement nearly occurs at the termination end portion 3a of the glass film 3 in the take-up direction during transport of the glass roll 1, the occurrence of the winding displacement can be prevented because the wide portion 6a of the displacement prevention film 6 is in a state of abutting on the flange 8 or abuts on the flange 8. That is, according to the glass roll 1 of this embodiment, the winding displacement during transport can be prevented even when the scattering prevention film 7 having a smaller width than the glass film 3 is used.

In addition, the displacement prevention film 6, which is detachable from the lead film 4, is on the termination end portion 3a side of the glass film 3 in the take-up direction, and is on a start end portion side of the film body F at the time of unwinding the glass film 3 from the glass roll 1. Accordingly, it is easy to detach the displacement prevention film 6 from the film body F when the glass film 3 is used by being unwound from the glass roll 1.

Figure 4:
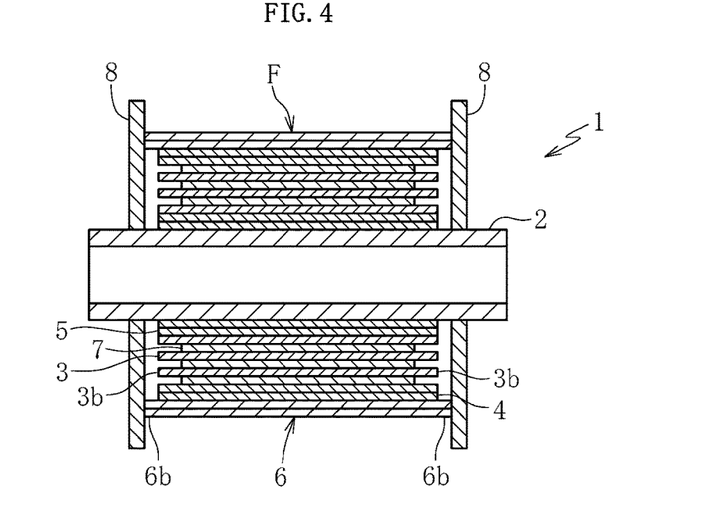
FIG. 4 is a schematic sectional view of a glass roll according to a second embodiment of the present invention.
Figure 5:
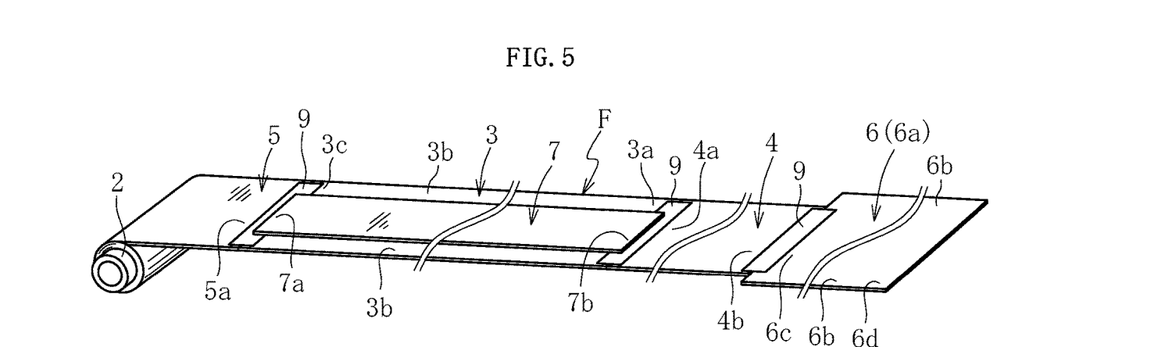
FIG. 5 is a schematic perspective view of a state in which a film body according to the second embodiment starts to be taken up by a winding core.
Figure 6:
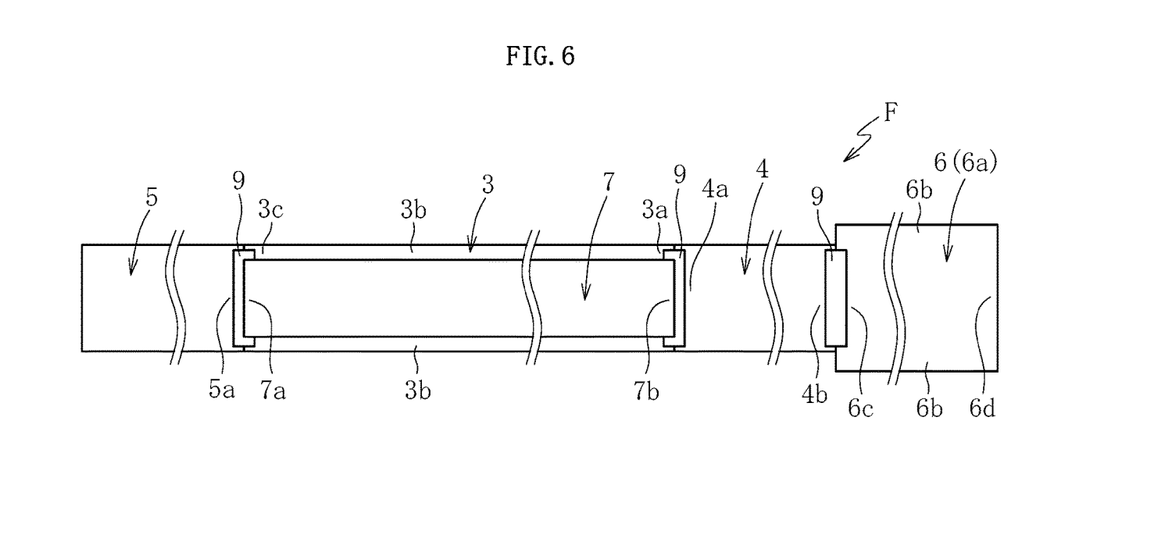
FIG. 6 is a schematic plan view of a state in which the film body according to the second embodiment is developed.

Next, a glass roll according to a second embodiment of the present invention is described with reference to FIG. 4 to FIG. 6.

A glass roll 1 of this embodiment differs from the glass roll of the first embodiment in that a displacement prevention film 6 is attached to a lead film 4 under a state in which the displacement prevention film 6 does not overlap with the lead film 4. Specifically, a termination end portion 4b of the lead film 4 in a take-up direction and a start end portion 6c of the displacement prevention film 6 in the take-up direction are in a state of butting each other, or in a state of facing each other with a gap therebetween. Moreover, the termination end portion 4b of the lead film 4 in the take-up direction and the start end portion 6c of the displacement prevention film 6 in the take-up direction are connected to each other by bonding a connecting tape 9 to the termination end portion 4b and the start end portion 6c so that the connecting tape 9 straddles both the portions. Other configurations are the same as in the first embodiment. Therefore, like configurations are denoted by like reference symbols, and description thereof is omitted.

Figure 7:
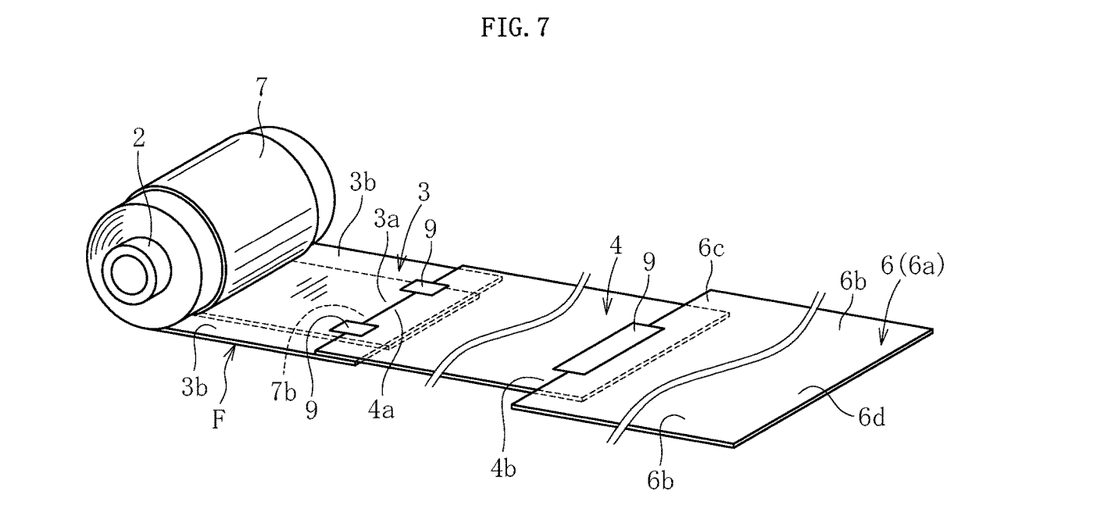
FIG. 7 is a schematic perspective view of a state in the course of taking up a film body of a glass roll according to a third embodiment of the present invention by a winding core.

Next, a glass roll according to a third embodiment of the present invention is described with reference to FIG. 7.

In this embodiment, unlike the first embodiment, a displacement prevention film 6 overlaps with a surface of a lead film 4 to be on an inner peripheral side of a glass roll 1 after the lead film 4 is taken up. In addition, unlike the second embodiment, the lead film 4 and the displacement prevention film 6 are connected to each other under a state in which an end portion of the lead film 4 and an end portion of the displacement prevention film 6 overlap with each other by bonding a connecting tape 9 to the end portions so that the connecting tape 9 straddles both the portions.

In addition, in this embodiment, unlike the above-mentioned embodiments, the lead film 4 overlaps a surface of the glass film 3 to be on the inner peripheral side of the glass roll 1 after the glass film 3 is taken up. Moreover, the glass film 3 and the lead film 4 are connected to each other under a state in which an end portion of the glass film 3 and an end portion of the lead film 4 overlap with each other by bonding a connecting tape 9 to the end portions so that the connecting tape 9 straddles both the portions. In addition, the connecting tapes 9 are each attached to a surface of the film body F to be on the inner peripheral side of the glass roll 1 after the film body F is taken up. A termination end portion 7b of a scattering prevention film 7 in a take-up direction is located at the same position in the take-up direction (longitudinal direction) as a termination end portion 3a of the glass film 3 in the take-up direction. Other configurations are the same as in the above-mentioned embodiments. Therefore, like configurations are denoted by like reference symbols, and description thereof is omitted.

Figure 8:
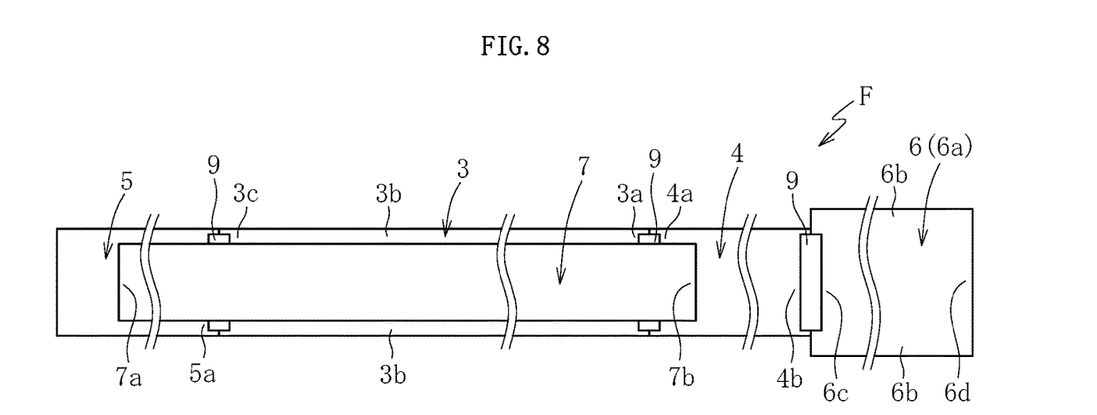
FIG. 8 is a schematic plan view of a state in which a film body according to a fourth embodiment of the present invention is developed.

Next, a glass roll according to a fourth embodiment of the present invention is described with reference to FIG. 8.

In this embodiment, unlike the above-mentioned embodiments, a scattering prevention film 7 extends from a glass film 3 to a middle portion of each of lead films 4 and 5 in a take-up direction (longitudinal direction). That is, end portions 7a and 7b of the scattering prevention film 7 in the longitudinal direction are located in the middle portions of the lead films 5 and 4 in the longitudinal direction, respectively. Such aspect is used particularly when the scattering prevention film 7 does not have a pressure-sensitive adhesive property, but may be used when the scattering prevention film 7 has a pressure-sensitive adhesive property. Other configurations are the same as in the second embodiment. Therefore, like configurations are denoted by like reference symbols, and description thereof is omitted.

Figure 9:
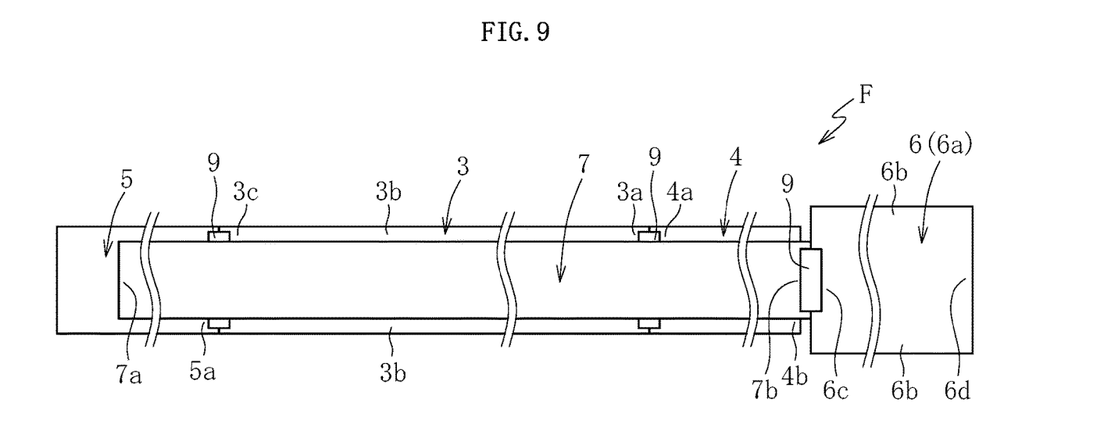
FIG. 9 is a schematic plan view of a state in which a film body according to a fifth embodiment of the present invention is developed.

Next, a glass roll according to a fifth embodiment of the present invention is described with reference to FIG. 9.

In this embodiment, unlike the above-mentioned embodiments, a displacement prevention film 6 is attached not to a lead film 4, but to a scattering prevention film 7. Specifically, the scattering prevention film 7 on a termination end portion 7b side in a take-up direction extends from a glass film 3 and passes the lead film 4 to a position beyond a termination end portion 4b of the lead film 4 in the take-up direction. Moreover, a termination end portion 7b of the scattering prevention film 7 in the take-up direction and a start end portion 6c of the displacement prevention film 6 in the take-up direction are in a state of butting each other, or in a state of facing each other with a gap therebetween. Moreover, the termination end portion 7b of the scattering prevention film 7 in the take-up direction and the start end portion 6c of the displacement prevention film 6 in the take-up direction are connected to each other by bonding a connecting tape 9 to the termination end portion 7b and the start end portion 6c so that the connecting tape 9 straddles both the portions. The termination end portion 4b of the lead film 4 in the take-up direction and the start end portion 6c of the displacement prevention film 6 in the take-up direction are in a state of facing each other with a gap therebetween. Other configurations are the same as in the fourth embodiment. Therefore, like configurations are denoted by like reference symbols, and description thereof is omitted.

Figure 10:
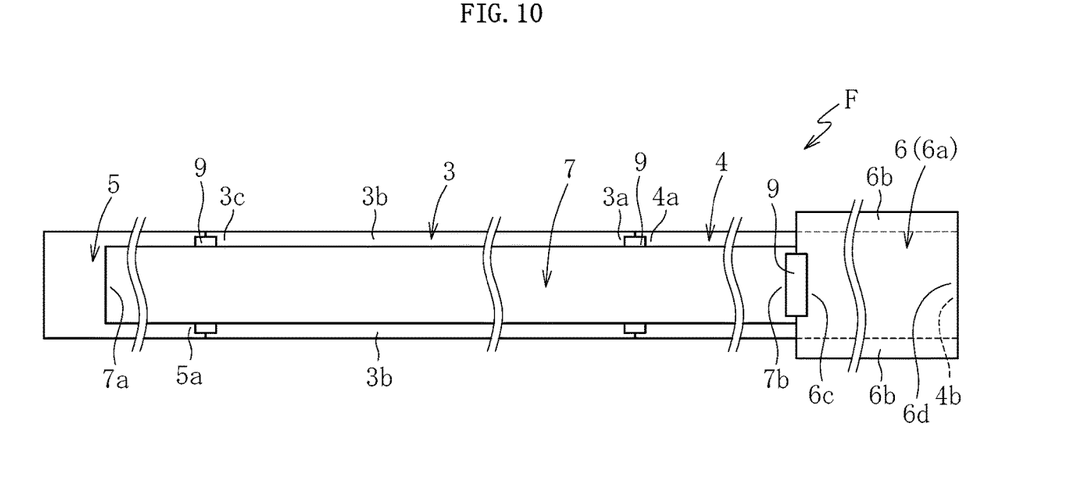
FIG. 10 is a schematic plan view of a state in which a film body according to a sixth embodiment of the present invention is developed.

Next, a glass roll according to a sixth embodiment of the present invention is described with reference to FIG. 10.

In this embodiment, as in the fifth embodiment, a start end portion 6c of a displacement prevention film 6 in a take-up direction is attached to a termination end portion 7b of a scattering prevention film 7 in the take-up direction. However, this embodiment differs from the fifth embodiment in that a termination end portion 6d of the displacement prevention film 6 in the take-up direction is located at the same position in the take-up direction as a termination end portion 4b of a lead film 4 in the take-up direction.

In this embodiment, the displacement prevention film 6 may or may not be bonded to the lead film 4 with an adhesive. When the displacement prevention film 6 is bonded to the lead film 4 with an adhesive, an adhesive with which a bonded portion between the displacement prevention film 6 and the lead film 4 can be separated again is used as the adhesive. Other configurations are the same as in the fifth embodiment. Therefore, like configurations are denoted by like reference symbols, and description thereof is omitted.

In the sixth embodiment, the following effects can be exhibited as compared to the fifth embodiment.

Figure 11:
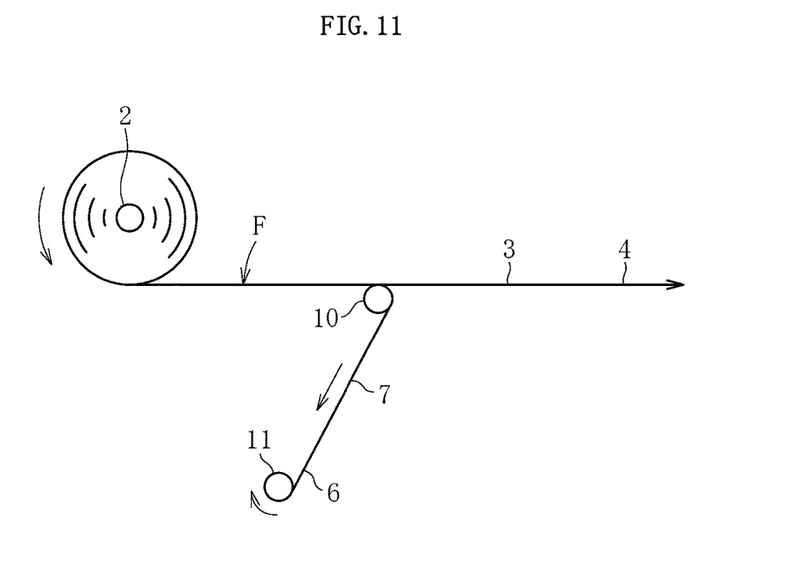
FIG. 11 is a schematic side view for illustrating a situation in which the film body according to the fifth embodiment or the sixth embodiment in a state of being taken up by a winding core is unwound therefrom.

When the displacement prevention film 6 is attached to the scattering prevention film 7, and the lead film 4 is attached to the glass film 3 as in the fifth embodiment and the sixth embodiment, at the time of unwinding the film body F in a state of having been taken up by the winding core 2, the scattering prevention film 7 is peeled off from the glass film 3 with a roller 10, and the scattering prevention film 7 is taken up by a winding core 11 with the displacement prevention film 6 at the forefront, as illustrated in FIG. 11. Meanwhile, the glass film 3 from which the scattering prevention film 7 has been peeled off is introduced into a predetermined treatment device with the lead film 4 at the forefront.

As described above, at the time of unwinding the film body F, first, it is required to introduce the displacement prevention film 6 attached to the scattering prevention film 7 to a winding core 11 side, and meanwhile, introduce the lead film 4 attached to the glass film 3 to a treatment device side. That is, it is required to separate the displacement prevention film 6 and the lead film 4 in order to introduce the displacement prevention film 6 and the lead film 4 in different directions.

At this time, when the termination end portion 6d of the displacement prevention film 6 is located at a greatly different position in the take-up direction from the termination end portion 4b of the lead film 4 as in the fifth embodiment, it becomes difficult to separate the displacement prevention film 6 and the lead film 4 from each other.

In contrast to this, when the termination end portion 6d of the displacement prevention film 6 is located at the same position in the take-up direction as the termination end portion 4b of the lead film 4 as in the sixth embodiment, it is easy to separate the displacement prevention film 6 and the lead film 4 from each other.

The present invention is not limited to the above-mentioned embodiments, and various modifications may be made within the scope of the technical idea of the present invention. For example, while the displacement prevention film 6 is attached to the lead film 4 or the scattering prevention film 7 in each of the above-mentioned embodiments, the displacement prevention film 6 may be attached to the glass film 3.

In addition, while the glass film 3 and each of the lead films 4 and 5 are connected to each other by bonding the connecting tape 9 to these components in each of the above-mentioned embodiments, the glass film 3 and each of the lead films 4 and 5 may be connected to each other by bonding these components with an adhesive. In this case, as the adhesive, the same adhesives as in the case of the pressure-sensitive adhesive layer of the connecting tape 9 may be used. In addition, as the adhesive, an adhesive with which the bonded portion between the glass film 3 and each of the lead films 4 and 5 can be separated again is used.

In addition, in the above-mentioned embodiments, description is made of the case where the glass film 3 is formed by the overflow down-draw method. However, the glass film 3 may be formed by a down-draw method, such as a slot down-draw method or a redraw method. When using the down-draw method in this way, unlike a case of forming the glass film 3 by a float method, the surface of the glass film 3 is not contaminated by tin or the like. Thus, there is an advantage that the glass film 3 can be used under a state in which the surface of the glass film 3 remains unpolished. The glass roll 1 is targeted for the glass film 3 having a small thickness, and hence it is also very advantageous to use the glass film with a surface remaining unpolished in terms of reducing a risk of breakage of the glass film 3. In view of ensuring smoothness of the surface of the glass film 3, it is preferred to adopt the overflow down-draw method or the redraw method among the down-draw methods.

REFERENCE SIGNS LIST 1 glass roll
2 winding core
3 glass film
3a termination end portion
4 lead film
4b termination end portion
6 displacement prevention film
6a wide portion
6c start end portion
7 scattering prevention film
8 flange
F film body

The invention claimed is:

1. A glass roll comprising:
   a winding core;
   a film body, which is taken up into a roll shape by the winding core, and comprises a glass film and a scattering prevention film having a smaller width than the glass film; and
   flanges, which are mounted to the winding core, and are arranged on both sides of the film body in a width direction,
   wherein the film body comprises a detachable displacement prevention film on a termination end portion side of the glass film in a take-up direction,
   wherein the detachable displacement prevention film comprises a wide portion having a larger width than the glass film,
   wherein the film body further comprises a lead film having a smaller width than the wide portion on the termination end portion side, and
   wherein the detachable displacement prevention film is attached to the lead film.

2. The glass roll according to claim 1,
   wherein the detachable displacement prevention film is in a state of overlapping with the lead film, and
   wherein an overlapping region of the detachable displacement prevention film with the lead film is bonded to the lead film.

3. The glass roll according to claim 1, wherein a start end portion of the detachable displacement prevention film in the take-up direction is attached to a termination end portion of the lead film in the take-up direction.

* * * * *